3,055,910
HYDRAZINONITROFURYLTHIAZOLES

Donald Edward Dickson, Lake Bluff, and William Reese Sherman, Lake Forest, Ill., assignors to Abbott Laboratories, North Chicago, Ill., a corporation of Illinois
No Drawing. Filed Jan. 11, 1961, Ser. No. 81,941
11 Claims. (Cl. 260—306.8)

The present invention is concerned with novel chemical compounds of the formula

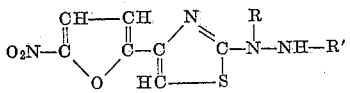

wherein R is hydrogen or acetyl and R' is hydrogen, acetyl, formyl or phenylthiocarbamyl. These compounds are crystalline solids which are soluble in many organic solvents but difficultly soluble in water. They are active as parasiticides and in particular as antibacterial agents. They may be employed advantageously as active toxic constituents of disinfectant compositions for the control of bacteria such as *Salmonella typhimurium* and *E. coli*. For such use, the compounds or their acid-addition salts can be dispersed on an inert, finely divided solid and employed as a dust or they can be dispersed in water or oil with or without a wetting, dispersing or emulsifying agent and employed as a spray. In actual tests, 2-hydrazino-4-(5-nitro-2-furyl)-thiazole gave excellent control of the growth of the above-named microorganisms when employed as an aqueous solution in a concentration of 50 parts per million.

The 2-hydrazino-4-(5-nitro-2-furyl)-thiazole of this invention can be conveniently prepared by the reaction of 2-(2-isopropylidenehydrazino)-4-(5-nitro-2-furyl)-thiazole with aqueous hydrochloric acid at a temperature of about 100° C. Reaction of the resulting 2-hydrazino derivative with acetic anhydride at about 50° C. will produce 2-(2-acetylhydrazino)-4-(5-nitro-2-furyl) - thiazole which when further reacted with more acetic anhydride at 110° C. results in the formation of the corresponding diacetylhydrazino derivative. The reaction of 2-hydrazino-4-(5-nitro-2-furyl)-thiazole with formic acid at about 50° C. will produce 2-(2 - formylhydrazino)-4-(5 - nitro-2-furyl)- thiazole whereas reaction of equimolecular proportions of 2-hydrazino-4-(5-nitro-2-furyl) - thiazole and phenylisothiocyanate at the boiling temperature of the reaction mixture results in the formation of 2-(4-phenyl-1-thiosemicarbazido)-4-(5-nitro-2-furyl)-thiazole.

The following examples are presented for the purpose of illustrating rather than limiting the present invention.

EXAMPLE 1

*2-Hydrazino-4-(5-Nitro-2-Furyl)-Thiazole*

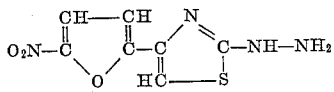

A solution of 6.8 grams (0.025 mole) of 2-(2-isopropylidenehydrazino)-4-(5-nitro-2-furyl)-thiazole in 130 ml. of 6 N hydrochloric acid was heated at the boiling temperature for one minute. After filtration, the filtrate was made basic with pyridine and the solid which precipitated was collected. Upon crystallization from pyridine, the desired 2-hydrazino-4-(5-nitro-2-furyl)-thiazole was obtained as a crystalline solid which melted at 205°–206° C. with decomposition.

The base prepared above was converted to a hydrochloride salt by suspending one gram of the base in 6 ml. of concentrated hydrochloric acid and allowing the mixture to stand at room temperature for 10 minutes. The solid which resulted was separated by filtration and crystallized from an ethanol-ether mixture to obtain the crystalline hydrochloride which melted at 170°–172° C. Analysis calculated for $C_7H_6N_4O_3S \cdot HCl$: C=32.01%; H=2.69%; N=21.33%. Found: C=32.24%; H=2.74%; N=21.08%.

EXAMPLE 2

*2-(2-Acetylhydrazino)-4-(5-Nitro-2-Furyl)-Thiazole*

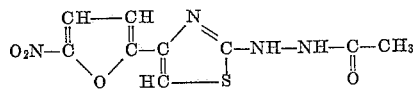

Fifteen grams (0.066 mole) of 2-hydrazino-4-(5-nitro-2-furyl)-thiazole was dissolved in 325 ml. of acetic anhydride and the resulting solution heated at 50° C. for 10 minutes. The reaction mixture was then cooled and the desired product separated by filtration. Upon recrystallization from aqueous acetic acid, the desired product was found to melt at 228°–230° C. Elemental analysis confirmed the identity of the product.

EXAMPLE 3

*2-(1,2-Diacetylhydrazino)-4-(5-Nitro-2-Furyl)-Thiazole*

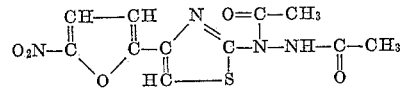

A mixture of one gram (0.003 mole) of 2-(2-acetylhydrazino)-4-(5-nitro-2-furyl)-thiazole and 15 ml. of acetic anhydride was heated at 110° C. for 5 minutes. The reaction mixture was then cooled and poured into an ice-water mixture. The solid product which precipitated was separated by filtration and after crystallization from ethanol melted at 219°–221° C. Upon analysis, the desired product was found to contain 18.07% nitrogen compared to the calculated value of 18.05% nitrogen.

EXAMPLE 4

*2-(2-Formylhydrazino)-4-(5-Nitro-2-Furyl)-Thiazole*

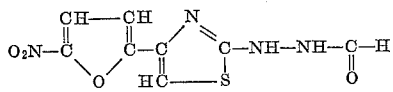

Five grams (0.022 mole) of 2-hydrazino-4-(5-nitro-2-furyl)-thiazole was dissolved in 50 ml. of formic acid and the resulting solution was heated at about 50° C. for 3 hours. Upon completion of the reaction, 70 ml. of water was added to the reaction mixture to precipitate the desired product which was separated by filtration. After crystallization from ethanol, the product was found to melt at 214°–215° C. with decomposition and contained 21.81% nitrogen compared to the calculated value of 22.04% nitrogen.

EXAMPLE 5

*2-(4-Phenyl-1-Thiosemicarbazido)-4-(5-Nitro-2-Furyl)-Thiazole*

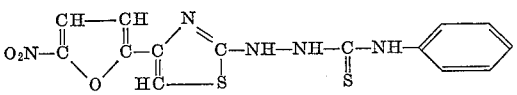

Five grams (0.022 mole) of 2-hydrazino-4-(5-nitro-2-furyl)-thiazole and 8.1 grams (0.06 mole) of phenylisothiocyanate were dissolved in three liters of ethyl acetate and the resulting solution heated at the boiling temperature and under reflux for 30 minutes. The reaction mixture was thereafter concentrated to precipitate the desired product which after recrystallization from ethanol melted at 181°–183° C. with decomposition. Upon analysis, the product was found to contain 19.15% nitrogen compared to the calculated value of 19.38% nitrogen.

The 2-(2-isopropylidenehydrazino)-4-(5-nitro-2-furyl)-thiazole employed as a starting material in Example 1 can be readily prepared by the reaction of equimolecular proportions of acetonethiosemicarbazone and 2-bromoacetyl-5-nitrofuran in a suitable solvent such as ethanol. The reaction takes place smoothly at steam bath temperature and is generally complete in about 10 minutes. Upon cooling the reaction mixture, the desired product precipitates and after separation and recrystallization from pyridine melts at 207° C.

What is claimed is:
1. A compound of the formula

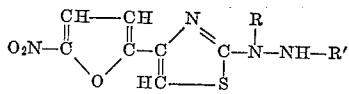

wherein R is a member of the group consisting of hydrogen and acetyl, and R' is a member of the group consisting of hydrogen, acetyl, formyl and phenylthiocarbamyl.

2. 2-hydrazino-4-(5-nitro-2-furyl)-thiazole.
3. 2-(2-acetylhydrazino)-4-(5-nitro-2-furyl)-thiazole.
4. 2-(1,2-diacetylhydrazino)-4-(5-nitro-2-furyl) - thiazole.
5. 2-(2-formylhydrazino)-4-(5-nitro-2-furyl)-thiazole.
6. 2-(4 - phenyl-1-thiosemicarbazido) - 4 - (5-nitro-2-furyl)-thiazole.
7. A method for the preparation of 2-hydrazino-4-(5-nitro-2-furyl)-thiazole which comprises reacting one molecular proportion of 2-(2-isopropylidenehydrazino-4-(5-nitro-2-furyl)-thiazole with at least one molecular proportion of hydrochloric acid in aqueous solution at about 100° C.
8. A method for the preparation of 2-(2-acetylhydrazino)-4-(5-nitro-2-furyl)-thiazole which comprises reacting one molecular proportion of 2-hydrazino-4-(5-nitro-2-furyl)-thiazole with at least one molecular proportion of acetic anhydride at about 50° C.
9. A method for the preparation of 2-(1,2-diacetylhydrazino)-4-(5-nitro-2-furyl)-thiazole which comprises reacting one molecular proportion of 2-(2-acetylhydrazino)-4-(5-nitro-2-furyl)-thiazole with at least one molecular proportion of acetic anhydride at about 110° C.
10. A method for the preparation of 2-(2-formylhydrazino)-4-(5-nitro-2-furyl)-thiazole which comprises reacting one molecular proportion of 2-hydrazino-4-(5-nitro-2-furyl)-thiazole with at least one molecular proportion of formic acid at a temperature of about 50° C.
11. A method for the preparation of 2-(4-phenyl-1-thiosemicarbazido) - 4 - (5-nitro-2-furyl)-thiazole which comprises reacting equimolecular proportions of 2-hydrazino-4-(5-nitro-2-furyl)-thiazole and phenylisothiocyanate at the boiling temperature of the reaction mixture and under reflux.

References Cited in the file of this patent
UNITED STATES PATENTS 2,481,673     Knott et al. _____ Sept. 13, 1949

FOREIGN PATENTS 198,760     Austria _____ July 25, 1958
852,795     Great Britain _____ Nov. 2, 1960

OTHER REFERENCES

Gilman et al.: J. Am. Chem. Soc., vol. 47, pp. 245–247 (1925).

Williams: "Detoxication Mechanisms" (Wiley), p. 194 (1947).

Ban: Chem. Abstracts, vol. 48, col. 9361–62 (1954).